United States Patent
Lyons et al.

(10) Patent No.: US 7,255,955 B2
(45) Date of Patent: Aug. 14, 2007

(54) HYDROUS PHOSPHATE CATALYSTS WITH LOW PLATINUM

(75) Inventors: Karen Swider Lyons, Alexandria, VA (US); Peter J Bouwman, Crofton, MD (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 655 days.

(21) Appl. No.: 10/672,270

(22) Filed: Sep. 26, 2003

(65) Prior Publication Data

US 2005/0069753 A1 Mar. 31, 2005

(51) Int. Cl.
*H01M 4/86* (2006.01)
(52) U.S. Cl. .............. 429/40; 429/44; 429/33; 429/30; 429/12
(58) Field of Classification Search ............ 429/40, 429/44, 33, 30, 12
See application file for complete search history.

(56) References Cited

OTHER PUBLICATIONS

Chiang et al, "Electronically Conductive Phospho-Olivines as Lithium Storage Electrodes", Massachusetts Institute of Technology, Oct. 2002, vol. 1, pp. 123-128.

AI et al, "Oxidation By Iron Phosphate Catalyst", Journal of Molecular Catalysis A: Chemical, 2000, vol. 159, pp. 19-24.

Johnstone et al, "Hydrogenation of Alkenes Over Palladium and Platinum Metals Supported on a Variety of Metal (IV) Phosphates", Journal of Molecular Catalysis A: Chemical, 2003, vol. 191, pp. 289-294.

Swider-Lyons et al, "Low-Platinum Hydrous Metal Oxides for PEMFC Cathodes", NRL DOE review, May 19, 2003, pp. 1-5.

Gadgil et al, "Study of FePO4 Catalys", Journal of Solid State Chemistry, 1994, vol. 111, pp. 357-364.

McCormick et al, "Methane Partial Oxidation by Silica-Supported Iron Phosphate Catalysts. Influence of Iron Phosphate Content on Selectivity and Catalyst Structure", Topics of Catalysis, 2000, vol. 10, pp. 115-122.

Vedrine et al, "Partial Oxidation Reactions on Phosphate-Based Catalysts", Topics of Catalysts, 2000, vol. 11/12, pp. 147-152.

Muneyama et al, "Characteristics of Iron Phosphate and Its Catalytic Activity for Oxidative Dehydrogenation of Isobutyric Acid", Bull. Chem. Soc. Jpn,, 1996, vol. 69, pp. 509-511.

*Primary Examiner*—Laura Weiner
(74) *Attorney, Agent, or Firm*—John J. Karasek; Joseph T. Grunkemeyer

(57) ABSTRACT

A device is provided having a cathode capable of catalytically reducing oxygen, an anode capable of catalytically oxidizing hydrogen, and an electrolyte in contact with both the anode and cathode. The cathode and/or anode contain transition-metal phosphates with the formula $M^1$—$M^2P_xO_y \cdot zH_2O$, where $M^1$ is a platinum group metal and $M^2$ is a transition metal.

21 Claims, 4 Drawing Sheets

HYDROUS PHOSPHATE CATALYSTS WITH LOW PLATINUM

BACKGROUND OF THE INVENTION

1. Field of the Invention

The invention relates generally to fuel cells and catalysts used therein

2. Description of the Prior Art

State-of-the-art proton-exchange membrane fuel cells (PEMFCs) contain high loadings of platinum (Pt), making the fuel cells costly and subject to fluctuations in the market availability of the noble metal. By using little or no Pt in fuel cell electrodes, the cost of the fuel cells and imports of noble metals can be drastically reduced.

Researchers recognized years ago that the Pt content of PEMFC electrodes could be reduced by making by dispersing nanoscale Pt particles on a porous, electronically conductive media (Vulcan carbon) and adding a proton conducting media (a perfluorosulfonic ionomer, Nafion®) (Raistrick, U.S. Pat. No. 4,876,115). When surrounded by Vulcan carbon and Nafion, the Pt serves more effectively as an electrocatalyst for hydrogen oxidation and oxygen reduction because there are ample transport paths for protons and electrons. Whereas the catalytic activity of the Pt is critical, the electrode reactions are mediated by the rate of the transport of the gases, protons, electrons, and water to and from the Pt surfaces.

The oxygen reduction reaction (ORR) at a fuel cell cathode is given in Equation (1) and the hydrogen oxidation reaction (HOR) at the anode is in Equation (2).

$$O_2 + 4H^+ + 4e^- \rightarrow 2H_2O \tag{1}$$

$$H_2 \rightarrow 2H^+ + 2e^- \tag{2}$$

For the reactions to proceed unencumbered, the catalyst site must have a supply of oxygen or hydrogen, protons, and electrons, and must be able to transport away water. The reaction above becomes limited when the transport of any of these four species is slow.

Hydrous phosphate and oxides have innate activity and their microporous or open-framework structures enhance proton conduction (see Colomban, Ed., "Proton conductors: solid, membranes and gels—materials and devices," Cambridge University Press, Cambridge (1992)). Hydrous iron phosphates are known as corrosion barriers, paint additives and friction coatings; anhydrous phosphate-based catalysts can be used for direct conversion of methane into oxygenates and oxidative dehydrogenation (see Otsuka et al., *Appl. Catal. A*, 222, 145-161 (2001)); and lithiated FePO$_4$ is being tested as a positive electrode in Li-ion batteries (see Padhi et al., *J. Electrochem. Soc.*, 144, 1188-1194 (1997)).

SUMMARY OF THE INVENTION

The invention comprises a device comprising a cathode capable of catalytically reducing oxygen or suitable fuel, an anode capable of catalytically oxidizing hydrogen, and an electrolyte in contact with both the anode and cathode. The cathode or anode or both comprise a phosphate catalyst comprising the formula:

$$M^1\text{—}M^2P_xO_y\cdot zH_2O$$

$M^1$ is one or more platinum group metals or alloys thereof. $M^2$ is a transition metal. The numbers x and y are positive numbers and z is a nonnegative number.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

Figure 1:
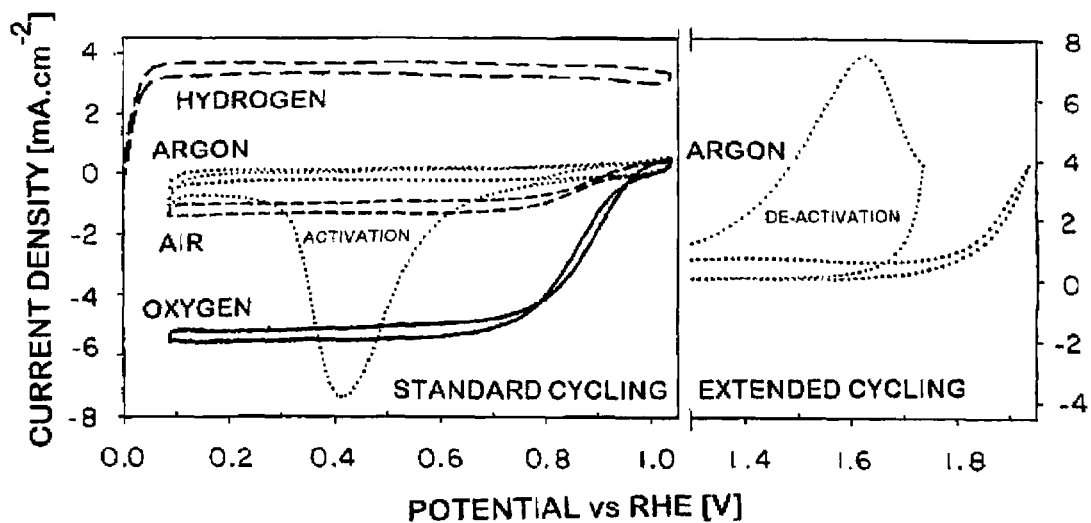
FIG. 1 shows the electrochemical behavior of Pt-iron phosphate-VC during cycling in various gases

The phosphate catalyst combines the oxidative properties of a platinum group metal with the proton transport properties of a hydrous metal phosphate. It allows for attraction and transport of (1) oxygen or fuel, (2) protons, (3) electrons, and (4) water. Since the phosphate catalyst can transport all these species, it may function as either a cathode or an anode or both. Oxide based catalysts are unlikely to migrate and ripen between 25 and 300° C., the general operating temperature range for phosphoric acid and PEM fuel cells.

A platinum group metal is used for $M^1$ because of its ability to catalytically reduce oxygen and oxidize hydrogen. The platinum group metal may be frilly distributed throughout the material so that there are no metallic particles that increase in size over time. The platinum group metals include platinum, palladium, ruthenium, iridium, osmium, and rhodium. Suitable metals for $M^1$ include platinum, palladium, iridium, and their alloys. The first catalyst may comprise less than about 30% $M^1$ by weight.

$M^2$ is a transition metal. Hydrous transition-metal phosphates are good proton and water conductors. Phosphates can also be less prone to poisoning (electrochemical activity degradation) than metals. Phosphates are also known for their oxygen affinity and therefore may increase the amount of oxygen drawn to and stored at the cathode. Many phosphate catalysts may also be resistant to dissolving under the highly corrosive conditions at the PEMFC cathode. Suitable metals for $M^2$ include, but are not limited to, iron, niobium, tin, tungsten, molybdenum, antimony, tantalum, vanadium, zirconium, zinc, titanium, chromium, and cobalt.

Although the phosphate catalysts may be termed amorphous, they can have nanoscale order in their atomic structures that can have a significant bearing on their activity and transport properties, and are often formed as open framework or microporous structures (see Cheetham et al., *Angew.*

Chem. Int. Ed., 1999, 38, 3268-3292). Although no particular structure of the phosphate catalyst is required, it can have an amorphous and/or nanocomposite structure of platinum group metal atoms or nanoparticles incorporated into the open framework or microporous structure of the hydrous metal phosphate. The open framework can allow for transport of reactants to and from the platinum atoms. It may also comprise platinum group metal particles adhered to a hydrous metal oxide surface.

The numbers x and y are positive numbers and z is a nonnegative number. They do not have to be integers, as they represent average values. A suitable range for x includes, but is not limited to, about 1 to about 5. A suitable range for y includes, but is not limited to, about 1 to about 20. A suitable range for z includes, but is not limited to, about 0 to about 2.

Powders of the phosphate catalyst can be prepared in ambient conditions from aqueous solutions of the transition metals, phosphates, and platinum and then heated at various temperatures to adjust water content. Alternatively, the Pt can be added by first synthesizing the hydrous phosphate as a powder (filtering, etc) and then mixing that powder (either air dried or oven heated from 125 to 200° C.) with $H_2Pt(OH)_6$ solution in acid. Chlorloplatinic acid is a common Pt precursor, but chloride is a poison to Pt electrocatalysis in fuel cells. In the event that chloride-containing precursors are used, the product can be mixed with an ion-exchange resin or other suitable process for chloride removal to eliminate chloride contamination.

The phosphate catalyst can be doped with a transition metal to modify its physical and electrical properties. The doped transition metal can alter the p- or n-type conduction of the phosphate catalyst (see Chung S Y, et. al. *Nature Mater.*, 2002, 1, 123-128). Doping with molybdenum, vanadium and lead has been shown to change the catalytic selectivity of iron phosphate for partial oxidation (see M. Ai, *Catal. Today*, 1999, 52, 65-69 and references therein).

The phosphate catalyst may be combined with a conductive support. The support can provide additional electron conduction and reduce the amount of phosphate catalyst needed per unit area. Suitable amounts of conductive support include, but are not limited to, up to 20% of the combined weight and up to 50% of the combined weight. Carbon black and Vulcan carbon are suitable conductive supports. The carbon can also be functionalized to increase the activity of the catalysts. Suitable functionalizations include, but are not limited to, nitrogen and phosphate. The catalyst can be combined with the support by mechanical mixing or the phosphate can be directly impregnated into carbon black by adding the carbon into the transition metal solution prior to the formation of the phosphate solid.

When only one electrode comprises the phosphate catalyst, the other electrode may comprise any oxygen reducing or hydrogen oxidizing catalyst as needed. Such catalysts are well known in the art of fuel cells. The electrolyte must be able to conduct protons from the anode to the cathode. Suitable electrolytes include, but are not limited to, Nafion and polybenzimidazole (PBI). Phosphoric acid may also be used in the case of phosphoric acid fuel cells.

The device can be used as a fuel cell. The design and construction of such fuel cells is well known in the art.

Having described the invention, the following examples are given to illustrate specific applications of the invention. These specific examples are not intended to limit the scope of the invention described in this application.

EXAMPLE 1

Preparation of platinum-hydrous iron phosphate—Hydrous iron phosphate was prepared by adaptation of the method disclosed in Gadgil et al., "Study of $FePO_4$ Catalyst," *J. Solid State Chem.*, 111, 357-364 (1994), incorporated herein by reference. Iron nitrate and ammonium dihydrogen phosphate were dissolved in water separately in a 1:1 molar ratio. The two solutions were mixed together and stirred for 1 h in ambient conditions. Next, $H_2Pt(OH)_6$ was added to the solution to obtain a Pt concentration between 1-10 wt % relative to iron phosphate. The mixture was stirred overnight, and sonicated to facilitate the dissolution of the $H_2Pt(OH)_6$. Next, the pH of the acidic solution was increased to pH~7 by the addition of 1 M ammonium hydroxide. The solution underwent a gelation at around pH=3. The resulting gelled precipitate was filtered from the solution, washed with high purity water, dried overnight in air, and then heated in air at 150° C. for 12 h. After grinding, the powders were heated again under vacuum for 12 h at 150° C.

The material was purified by stirring in 1 M sulfuric acid for 1 h at 90° C. The remaining powder was filtered and washed and subjected to the standard annealing treatment again (heating in air at 150° C. and then in vacuum at 150° C.). This acid-washing process can be repeated until an acid-stable powder is isolated.

The Pt-iron phosphate catalyst was mixed with Vulcan Carbon (VC) for electrochemical characterization. Generally, VC was mixed with the catalyst powder using mortar and pestle in a 1:1 weight ratio.

Alternatively, the Pt-iron phosphate was impregnated into the VC by adding the VC during the synthesis. In this case, the VC was added to the iron nitrate solution described above, and that solution was mixed with ammonium dihydrogen phosphate. The $H_2Pt(OH)_6$ was first dissolved in concentrated phosphoric acid (85 wt %). Both solutions were then mixed, stirred, neutralized, filtered, dried, heated at 150° C., and then washed in acid, and dried again using the procedures described above.

EXAMPLE 2

Preparation of platinum-hydrous niobium phosphate—1 part by mole of $NbCl_3$ was added slowly to 10 parts of concentrated $H_3PO_4$. The solution turned white as a solid precipitated. The solution was stirred for 24 h, filtered, and washed with $H_2O$. The material may also be rinsed over an anion-exchange column to reduce the amount of chloride impurities. The resulting white niobium phosphate powder was heated at 150° C. in air for 12 h. 1 part by mole of the niobium phosphate was mixed with 0.003 parts of Pt from a 0.005 M solution of $H_2Pt(OH)_6$ in 0.1 M $H_2SO_4$. The mixture was stirred for 40 min, filtered, and washed with water. While the Pt-impregnated niobium phosphate was still wet, it was heated to 200° C. in air at 12 h. The Pt-niobium phosphate powder was mixed with 80% VC (by weight) using a mortal and pestle.

EXAMPLE 3

Catalytic activity of Pt-iron phosphate—For evaluation of oxygen reduction activity, catalyst-VC powders were made into inks for casting on electrodes. Approximately 10 mg of the catalyst composite was stirred/sonicated in 1 g of a solution consisting of 26 parts high purity water, 7 parts isopropanol, and 67 parts of a 5 wt % Nafion® solution.

Several μL of the ink was pipetted onto the glassy carbon tip (diameter 5 mm) of a RDE to obtain a loading of 0.02 to 0.1 mg Pt/cm$^2$. The ink droplet was dried in a constant airflow to create a smooth film that covered the entire surface of the glassy carbon RDE tip. The thickness of the electrode film was calculated from the estimated density and did not exceed 10 μm, even when taking into account 50% porosity. Films that are thicker than 10 μm may suffer from diffusion limitations of the oxygen gas.

Half-cell measurements of the ORR were performed by rotating the loaded RDE tip at 1600 rpm (unless specified otherwise) in 30 mL of 0.1 M HClO$_4$ electrolyte at a temperature of 60° C. The gas atmosphere in the cell was controlled by bubbling a constant gas flow of 100 mL/min of argon, air, hydrogen, oxygen, or CO through the electrolyte solution. An EG&G. 263A potentiostat was used to cycle the RDE between 0.05 V and 1.00 V against a Pt counter electrode using a hydrogen-loaded palladium bead as a reference electrode. The measurement data was normalized vs. a reversible hydrogen electrode (RHE) and the current density was calculated using the geometric surface area of the glassy carbon (19.6 mm$^2$). The ORR activity was extracted from the difference in the current response of the sweeps measured in argon and oxygen to eliminate the contributions of any capacitive currents.

FIG. 1 shows the electrochemical behavior of Pt-iron phosphate mixed with VC (0.1 mg/cm$^2$) during cycling in argon (dotted line), air (dashed line), hydrogen (long dashed line), and oxygen (solid line) atmosphere. A catalyst "activation" peak was observed during the first cycle in argon at around 0.6 V vs RHE. A corresponding "de-activation" peak was encountered at around 1.6 V when the cycling range was extended to 1.9 V. These data indicate that some of the phosphates may need to be activated (electrochemically or by gas treatment) to realize their full catalytic activity.

Figure 2:
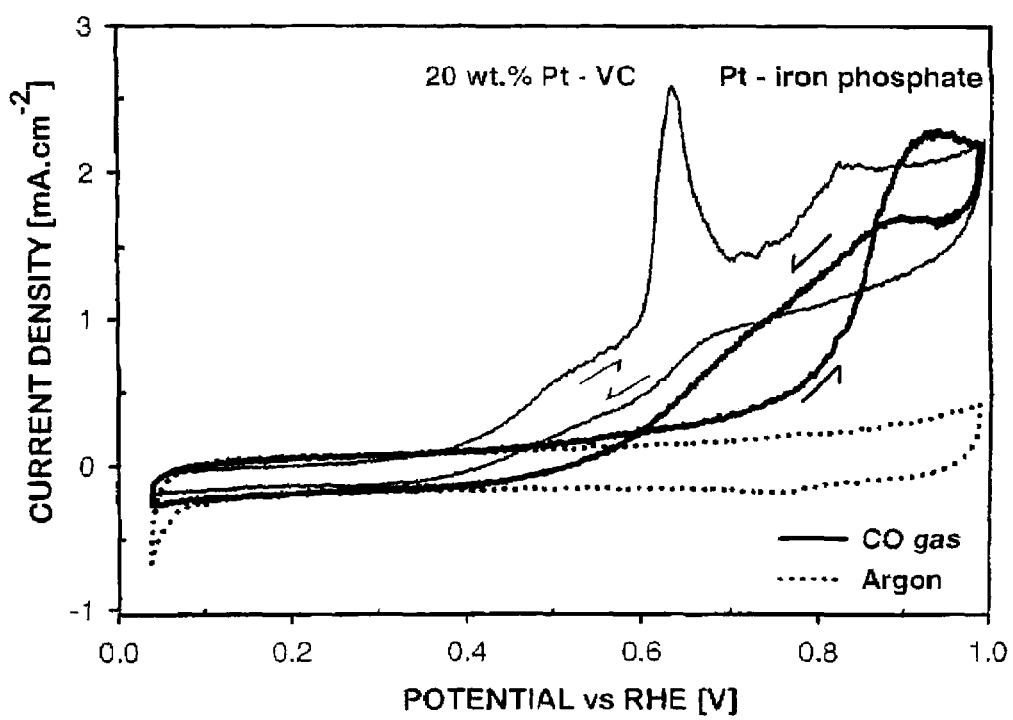
FIG. 2 shows the CO-adsorption characteristics of 4 wt % Pt-iron phosphate-VC compared to a standard 20 wt % Pt-VC electrode.

FIG. 2 shows the CO-adsorption characteristics of Pt-iron phosphate-VC (thick solid line) compared to a 20 wt % Pt-VC electrode (thin solid line) during continuous cycling in 100% CO atmosphere. In contrast to Pt-VC, the Pt-iron phosphate-VC catalyst did not exhibit a specific CO adsorption peak, and instead the CO appeared to be oxidized to CO$_2$ from 0.6 to 1.0 V. No traces of CO activity could be detected after flushing the cell with argon for 15 minutes (dotted line).

Figure 3:
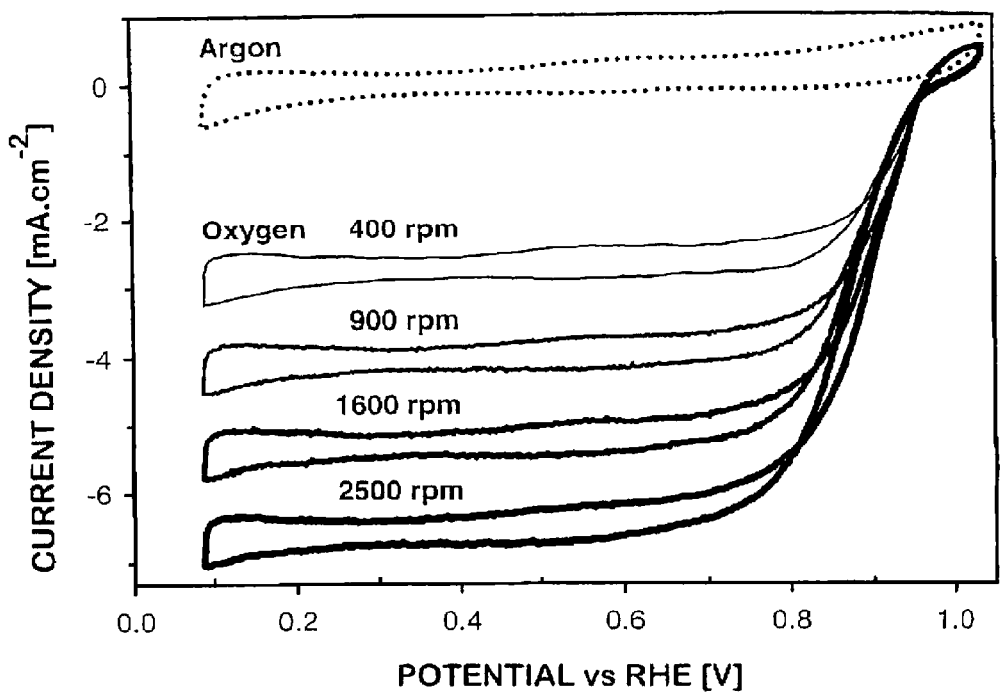
FIG. 3 shows the ORR current of Pt-iron phosphate-VC in oxygen atmosphere at various RDE (rotating disk electrode) rotation rates.

FIG. 3 shows the ORR current of Pt-iron phosphate-VC (0.1 mg/cm$^2$) in oxygen atmosphere at various RDE rotation rates (solid lines). The ORR showed Levich behavior and the limiting current increased linearly with the square of the rotation rate. The electrochemical behavior in argon atmosphere (dotted line measured at 1600 rpm) was independent of RDE rotation.

Figure 4:
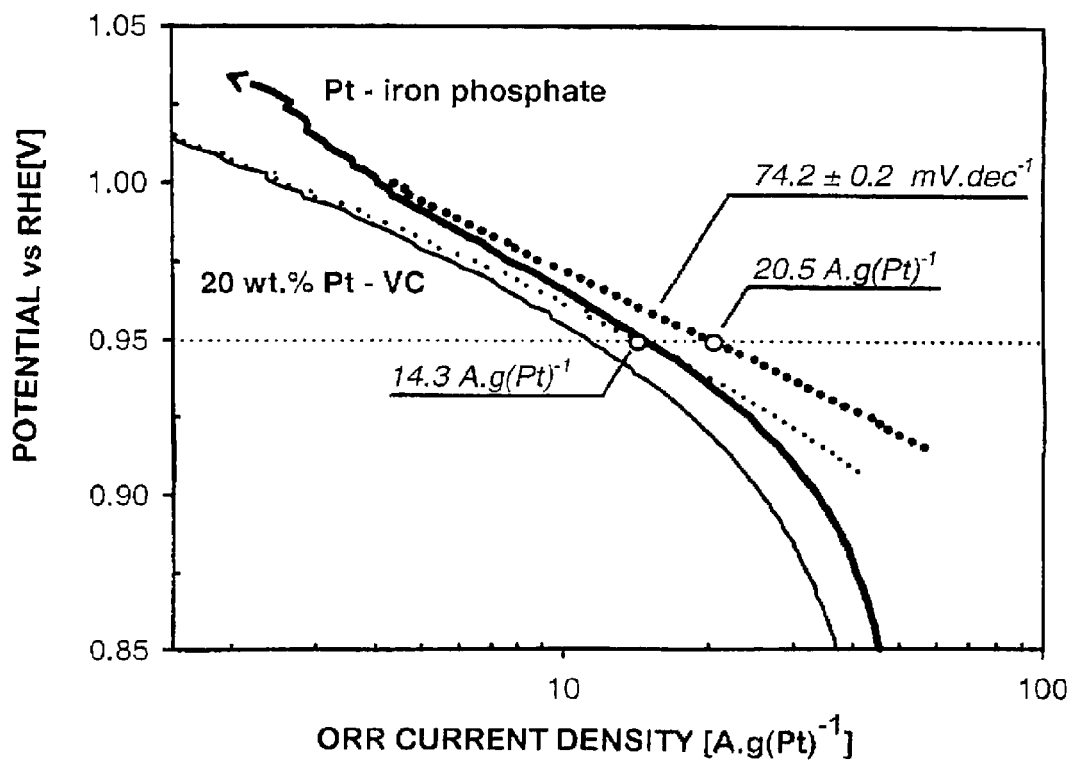
FIG. 4 shows a Tafel plot showing the ORR performance of electrodes with Pt-iron phosphate-VC and a standard 20% Pt-VC electrode.

FIG. 4 shows a Tafel plot showing the ORR performance of a 4 wt % Pt-iron phosphate-VC electrode (0.1 mg/cm$^2$, thick solid line). The ORR behavior of a standard 20% Pt-VC electrode is included for comparison (thin solid line). The data sets corrected for diffusion limitation are superimposed as dotted lines on top of the raw data. The corresponding Tafel slopes and the kinetic current values (at 0.95 V vs. RHE) after correction for diffusion limitation are indicated and listed in Table 1. The Pt-iron phosphate-VC had higher activity per wt % Pt than the Pt-VC standard.

TABLE 1

| Catalyst material | Pt loading [μg(Pt)/cm$^2$] | $I_{kinetic}$ at 0.95 V vs. RHE [A/g(Pt)] | Tafel slope [mV/dec] |
|---|---|---|---|
| Pt - iron phosphate - VC | 98 ± 3 | 20.5 | −73.0 ± 0.2 |
| Standard 20 wt. % Pt - VC | 100 ± 3 | 14.3 | −69.8 ± 0.8 |

Figure 5:
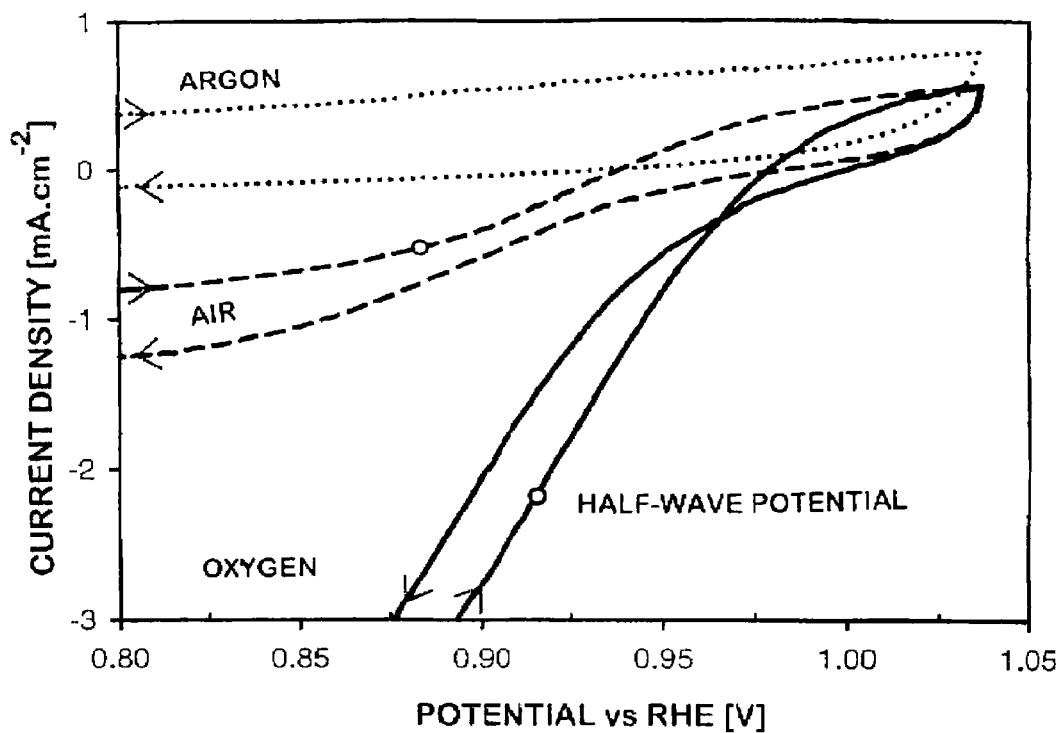
FIG. 5 shows portions of the cyclic voltammograms of Pt-iron phosphate-VC under argon, air, and oxygen atmospheres.

FIG. 5 shows cyclic voltammograms of impregnated Pt-iron phosphate-VC in argon (dotted line), air (dashed line), and oxygen atmosphere (solid line) showing the onset of the ORR activity. The arrows indicate the scan direction.

Figure 6:
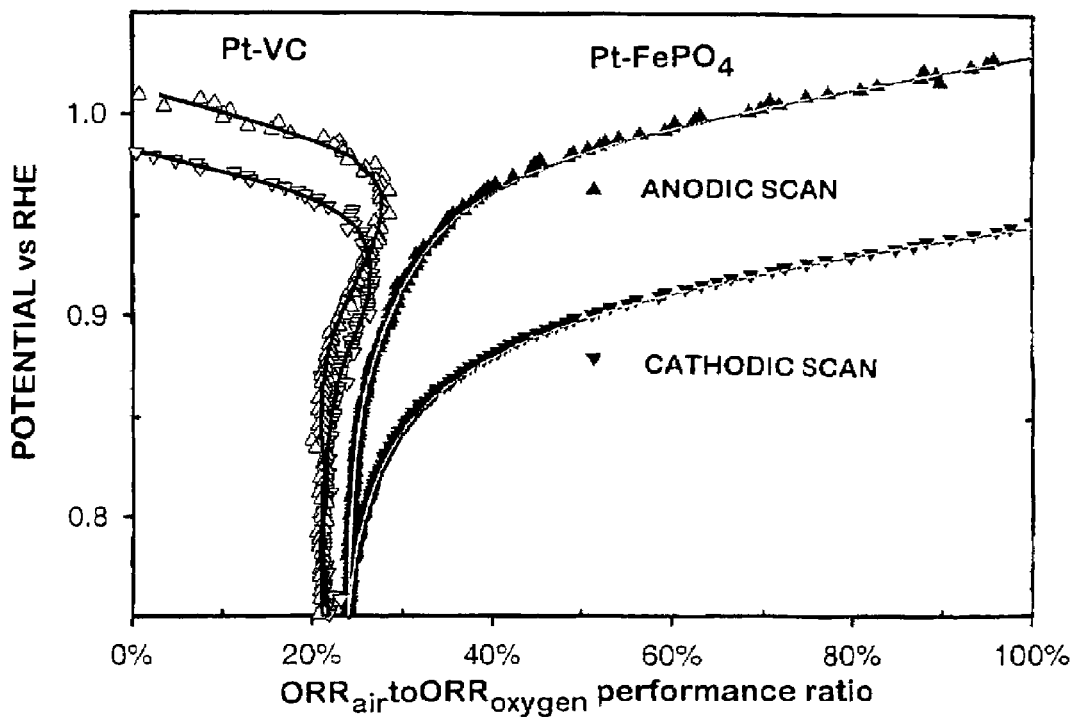
FIG. 6 shows a comparison of the relative ORR activity in air to that in oxygen atmosphere for an impregnated Pt-iron phosphate.

FIG. 6 shows the relative ORR activity in air compared to that in oxygen atmosphere for Pt-iron phosphate-VC (solid triangles) and 20% Pt-VC electrode (open triangles) of similar loading (0.1 mg Pt.cm$^{-2}$). The ratios of the ORR currents are plotted as a function of the electrode potential values for the anodic and cathodic scan. The performance of the standard catalyst decreased at high potentials in air vs. oxygen, indicating that the performance of the standard catalyst was limited by the oxygen concentration. In contrast, the Pt-iron phosphate-VC ORR activity was the same in air and oxygen (anodic scan) at high potentials, suggesting that the iron phosphate matrix either stores or attracts oxygen.

Figure 7:
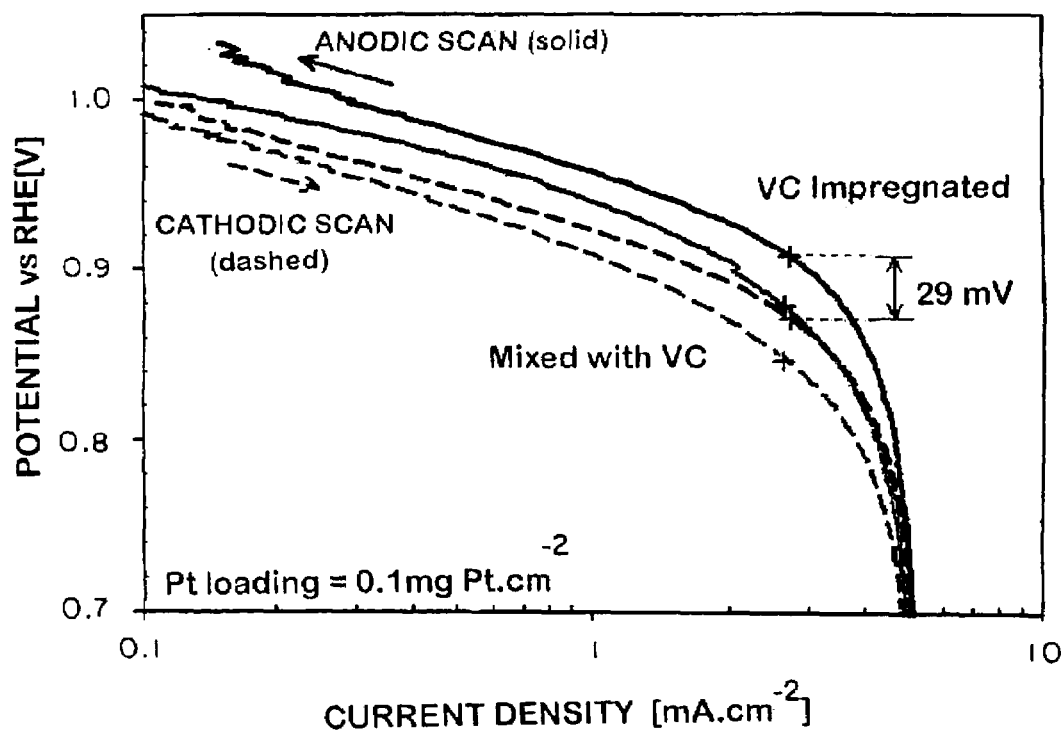
FIG. 7 shows a Tafel plot showing the difference in performance of Pt-iron phosphate when ~30 μm particles were physically mixed with VC vs. when nanoparticles were impregnated on VC.

FIG. 7 shows a Tafel plot showing the difference in performance of Pt-iron phosphate-VC when ~30 μm particles were physically mixed with VC vs. when nanoparticles were impregnated into VC. The half-wave potential of the catalysts increased by 29 mV for the VC-impregnated catalysts, indicating that the Pt-iron phosphate impregnated on VC had higher catalytic activity than that which was physically mixed with VC. Microscopy showed that the particle size of the former sample was smaller than the latter. The Pt-iron phosphate impregnated onto VC had better ORR performance than that mixed with VC presumably because it had higher surface area and better electronic contact with the carbon support. These data suggest that the activity of the phosphate catalysts can be improved by making nanoscale particle embedded on Vulcan carbon, or another appropriate conductive support.

The surface area and porosity of the Pt iron phosphates was measured by the Brunauer-Emmet-Teller (BET) method. As shown in Table 2, iron phosphate (heated at 150° C.) had a surface area of 136 m$^3$/g and a pore size of about 4 nm. The 9.5 wt % Pt-iron phosphate (also heated at 150° C.) had a lower surface area (~60 m$^3$/g) than the pure iron phosphate, but it had a bi-modal pore structure of micropores that were less than 2 nm and some that were larger than 11 nm. These data confirm that active catalysts have micropores and open framework structures, which are ideal for protonic conduction.

TABLE 2

| Catalyst material | BET surface area [m$^2$/g] | Average pore size [nm] |
|---|---|---|
| Iron phosphate | 136 ± 0.3 | 3.86 ± 0.01 |
| Acid-stable 9.5 wt % Pt-iron phosphate (bimodal distribution) | 56.4 ± 0.4 (62.3 ± 0.4)* | <2 nm 11 nm |

*value corrected for Pt content

EXAMPLE 4

Figure 8:
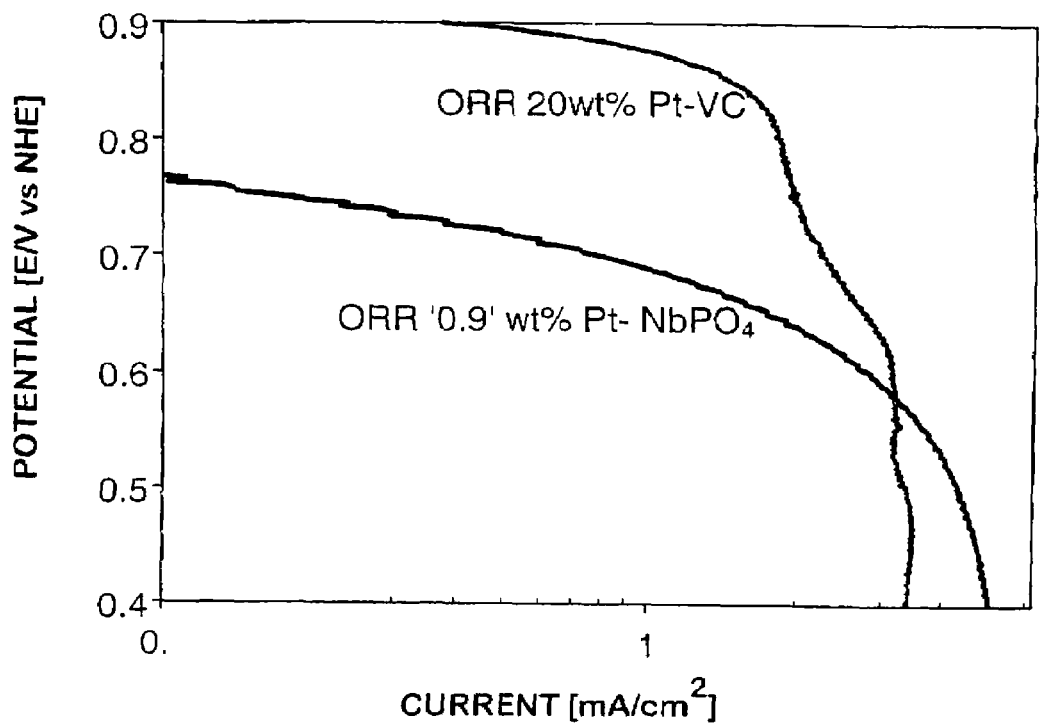
FIG. 8 shows a Tafel plot of the voltage-current performance of a hydrous 0.9% Pt-niobium phosphate-VC.

Catalytic activity of Pt-niobium phosphate—Hydrous 2.5% Pt-niobium phosphate-VC had favorable electrochemical performance for the ORR. The current-voltage response of 0.9% Pt-NbPO$_x$-VC (2.5% Pt-NbPO$_x$ mixed with 65% VC) vs. a 20% Pt-VC standard is shown in the Tafel plot in FIG. 8. The Pt-niobium phosphate-VC material performed well vs. the 20% Pt-VC standard at high current densities. The open circuit potential of Pt-niobium phosphate-VC was lower than that of the 20% Pt-VC, but it may be increased by doping with other transition metals.

Obviously, many modifications and variations of the present invention are possible in light of the above teachings. It is therefore to be understood that the claimed invention may be practiced otherwise than as specifically described.

We claim:

1. A device comprising:
   a cathode capable of catalytically reducing oxygen;
   an anode capable of catalytically oxidizing hydrogen; and
   an electrolyte in contact with both the cathode and the anode;
   wherein the anode, the cathode, or both comprise a phosphate catalyst comprising a mixture of M$^1$ and M$^2$P$_x$O$_y$·zH$_2$O
   wherein M$^1$ is one or more platinum group metals or alloys thereof;
   wherein M$^2$ is a transition metal;
   wherein x and y are positive numbers; and
   wherein z is a nonnegative number.

2. The device of claim 1, wherein the cathode comprises the phosphate catalyst.

3. The device of claim 1, wherein M$^1$ is platinum.

4. The device of claim 3, wherein phosphate catalyst comprises less than about 30% platinum by weight.

5. The device of claim 1, wherein M$^1$ is palladium.

6. The device of claim 1, wherein M$^1$ is one or more platinum group metal alloys.

7. The device of claim 1, wherein M$^2$ is selected from the group consisting of iron, niobium, tin, tungsten, molybdenum, antimony, tantalum, vanadium, zirconium, zinc, titanium, chromium, cobalt, and combinations thereof.

8. The device of claim 1, wherein M is iron.

9. The device of claim 1, wherein M$^2$ is niobium.

10. The device of claim 1,
    wherein x is from about 1 to about 5;
    wherein y is about 1 to about 20; and
    wherein z is about 0 to about 2.

11. The device of claim 1, wherein the phosphate catalyst is doped with a second transition metal.

12. The device of claim 11, wherein the phosphate catalyst is a p-or n-type conductor.

13. The device of claim 11, wherein the transition metal is molybdenum.

14. The device of claim 1, wherein the phosphate catalyst is combined with a conductive support.

15. The device of claim 14, wherein the combination of the phosphate catalyst and the conductive support comprises at least 20% by weight of the conductive support.

16. The device of claim 14, wherein the combination of the phosphate catalyst and the conductive support comprises at least 50% by weight of the conductive support.

17. The device of claim 14, wherein the conductive support is carbon black.

18. The device of claim 14, wherein the conductive support is Vulcan carbon.

19. The device of claim 1, wherein the device is a fuel cell.

20. The device of claim 1, wherein the cathode and the anode are coated on opposing surfaces of a proton-conducting membrane.

21. The device of claim 20, wherein the proton-conducting membrane comprises a perfluorosulfonic acid polymer.

* * * * *